(No Model.)

M. R. GRAY.
COMBINED THREAD CUTTER AND THIMBLE.

No. 535,285. Patented Mar. 5, 1895.

Witnesses:
John I. Wilson
Percy C. Bowen

Inventor:
Margaret Russell Gray
By Whitman & Wilkinson
Attorneys.

UNITED STATES PATENT OFFICE.

MARGARET RUSSELL GRAY, OF AUCKLAND, NEW ZEALAND.

COMBINED THREAD-CUTTER AND THIMBLE.

SPECIFICATION forming part of Letters Patent No. 535,285, dated March 5, 1895.

Application filed October 6, 1894. Serial No. 525,106. (No model.)

*To all whom it may concern:*

Be it known that I, MARGARET RUSSELL GRAY, a subject of the Queen of Great Britain and Ireland, and a resident of Auckland, in the Colony of New Zealand, have invented a certain new and useful Combined Thread-Cutter and Thimble, of which the following is a specification.

My invention relates to improvements in thimbles provided with thread-cutting devices, and it consists of certain novel features hereinafter described and claimed.

Reference is had to the accompanying drawings, in which the same parts are indicated by the same letters throughout the several views.

Figure 1:
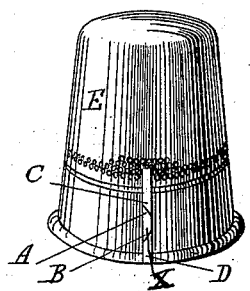
Figure 3:
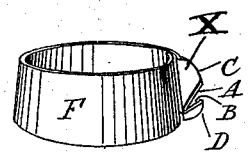
Figure 2:
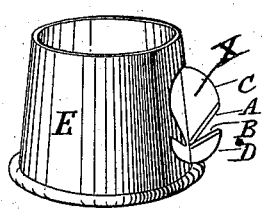
Figure 4:
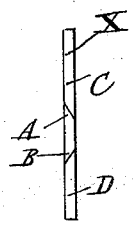
Figure 5:
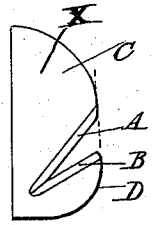

Figure 1 is a perspective view of a thimble, looking at the edge of the cutter. Fig. 2 is a perspective view of a thimble, showing the side of the cutter. Fig. 3 is a detail view showing a modified form of cutter consisting of a spring ring adapted to fit over the body of the thimble, and shows the cutter in side elevation. Fig. 4 is a detail view of the cutter, enlarged, looking at the edge thereof, and Fig. 5 is a side elevation looking toward the right, of the cutter shown in Fig. 4.

In Figs. 1 and 2, E represents the body of the thimble, and in all the figures, X represents the cutter.

The cutter X consists of a flat lug attached to the body of the thimble, and formed with the blunt rounded edges C and D on opposite sides of the cutting edges A and B. These cutting edges A and B are beveled as shown, and one of the edges indicated by B in the drawings, is shorter than the other A. By having these cutting edges in the form of an inclined V with its apex toward the thimble the thread is very readily cut by one or the other of the said edges.

In using my invention, the thread will slide over the blunt rounded edges C and D without catching in the slot, while the thimble is in ordinary use, but when it is desired to cut the thread, it may be readily guided into the space between the cutting edges A and B, and will slide down one of the said edges, being virtually sawed in two thereby. If the thread is not cut by contact with the cutting edge while sliding inward, it will be readily cut by the combined effect of the two cutting edges, as soon as it reaches the apex of the angle formed by the two cutting edges.

By having the edges C and D of the cutter X blunt and rounded and smooth, as in my invention it will readily be seen that there is little if any danger of the cutter becoming entangled in the thread, or catching in the cloth while the thimble is in use; and by having the cutting edges formed so that no plane surface can come in contact with them or either of them, it will also be seen that danger of injury to them by coming in contact with hard rough surfaces, will be entirely obviated.

In Fig. 1 I have shown the cutter X as brazed to the side of the thimble; in Fig. 2 I have shown the cutter as stamped out of the side of the body of the thimble, and in Fig. 3 I have shown a still further modification of cutter in which the spring ring F is adapted to fit over the body of the thimble, and is thus removable at pleasure; but in all these views the form of my cutter is the same, being that illustrated in Figs. 4 and 5, the manner in which it is attached to the body of the thimble being immaterial, so long as the form of the cutter remains the same as hereinbefore described.

Having thus described my invention, what I claim, and desire to secure by Letters Patent of the United States, is—

A thimble provided with a thread cutting device consisting of the flat lug X having the inwardly converging beveled cutting edges A and B of different length forming an inclined V-shaped slot, and the blunt rounded edges C and D on opposite sides of the said cutting edges, the said blunt rounded edges serving as a guide for the thread and a guard to the said cutting edges, substantially as and for the purposes described.

In witness whereof I have hereunto set my hand in the presence of two subscribing witnesses.

MARGARET RUSSELL GRAY.

Witnesses:
 ANDREW GRAY,
  *Clerk, Auckland, New Zealand.*
 WALTER D. COSSAR,
  *Sol'rs. Clerk, Auckland, N. Z.*